(12) United States Patent
Mourlam (10) Patent No.: US 10,605,623 B1
(45) Date of Patent: Mar. 31, 2020

(54) NO-BACKLASH ROTATION MEASUREMENT SYSTEM

(71) Applicant: Altec Industries, Inc., Birmingham, AL (US)

(72) Inventor: Timothy J. Mourlam, Kansas City, KS (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/671,993

(22) Filed: Nov. 1, 2019

(51) Int. Cl.
*B62D 15/02* (2006.01)
*G01D 5/14* (2006.01)
*F16H 1/06* (2006.01)

(52) U.S. Cl.
CPC .............. *G01D 5/142* (2013.01); *F16H 1/06* (2013.01)

(58) Field of Classification Search
CPC ........... B62D 5/0409; F16H 2057/0213; F16H 55/24; F16H 57/021; F16H 55/18; F16C 2361/61; F16C 2380/27; F16C 25/083
See application file for complete search history.

(56) References Cited

U.S. PATENT DOCUMENTS

| | | | |
|---|---|---|---|
| 4,827,786 A | 5/1989 | Bailey | |
| 5,115,159 A * | 5/1992 | Takamiya | B62J 6/12 310/156.12 |
| 7,841,231 B2 * | 11/2010 | Kang | B62D 15/0215 73/117.02 |
| 8,833,195 B2 | 9/2014 | Long | |
| 8,881,583 B2 * | 11/2014 | Sakaguchi | F03D 7/0244 73/112.01 |
| 9,513,102 B2 * | 12/2016 | Braun | G01D 5/14 |
| 2004/0144192 A1 * | 7/2004 | Tomaru | B62D 1/181 74/492 |
| 2007/0090830 A1 * | 4/2007 | Shiraga | G01D 5/04 324/207.25 |
| 2007/0103147 A1 * | 5/2007 | Kondo | B62D 15/0215 324/207.25 |
| 2009/0146650 A1 * | 6/2009 | Hatanaka | G01D 5/04 324/207.25 |
| 2012/0119731 A1 * | 5/2012 | Deitmerg | B62D 15/0215 324/207.25 |
| 2014/0043019 A1 * | 2/2014 | Braun | G01D 5/14 324/207.13 |
| 2014/0103912 A1 * | 4/2014 | Schnieders | B62D 15/021 324/207.2 |
| 2018/0127026 A1 * | 5/2018 | Kim | B62D 15/0215 |
| 2018/0230997 A1 * | 8/2018 | Dearden | F04C 2/18 |

FOREIGN PATENT DOCUMENTS

JP   H0861438   3/1996

* cited by examiner

*Primary Examiner* — Alesa Allgood
(74) *Attorney, Agent, or Firm* — Erise IP, P.A.

(57) ABSTRACT

A rotation measurement system is shown and described herein. In some embodiments, the rotation measurement system comprises a pinion gear comprising an elastic material allowing the pinion gear to deform. The elastic deformation of the pinion gear provides a complete mesh such that there is no backlash between the pinion gear and a main gear when the pinion gear is pressed into the main gear. The pinion gear may be held in place with at least one spring pressing the pinion gear into the main gear. A sensor for measuring the rotation of the pinion gear may be decoupled from the pinion gear assembly by utilizing a Hall effect sensor to detect a magnetic field of a magnet disposed on a shaft coupled to the pinion gear.

13 Claims, 9 Drawing Sheets

NO-BACKLASH ROTATION MEASUREMENT SYSTEM

BACKGROUND

1. Field

Embodiments of the invention relate to rotation measurement systems. Specifically, embodiments of the invention relate to increasing the accuracy of rotation measurements by reducing backlash in rotating systems.

2. Related Art

Utility workers utilize aerial devices, cranes, and other utility vehicles to perform numerous tasks. Utility vehicles typically include a boom assembly that aids in performing the task and that rotates on a stable platform. In the case of an aerial device or utility vehicle, the boom assembly supports a utility platform in which one or more utility workers stand. In the case of a crane, the boom assembly lifts and moves heavy loads all while rotating to place the loads. In these and other scenarios, measuring the rotation and angle to know where the boom and load is in space is important for various operations.

Typically, rotation type vehicles such as cranes, utility vehicles, boom trucks, and aerial devices are difficult to accurately measure the rotation and the state of the vehicle. Typical rotation vehicles can only accurately measure the angle of rotation of utility vehicle components to within a couple of degrees. This is, in part, due to backlash and coupled measurement devices. Typical current measurement devices are attached directly to, or coupled to, the gears, rotating equipment, or measure motor information to estimate the angles of rotating equipment. Typically, gears in connection with the sensors may not be meshed providing space between the gears known as backlash. This space must be provided because the gears are metal and brittle. Additionally, the gears are manufactured with tolerances, which, over time, wear, expand and contract with the weather. Because gears are not perfectly round, the gears must provide space between the gear teeth. If this space is not provided, as the gears rotate elliptically, the imperfections will cause stress in the gears resulting in binding and breaking. Because there is necessary space, this provides an error in the measurement of where the actual components are relative to one another. The gear teeth may be anywhere in the space provided and as such, the location cannot be perfectly determined. As the gears become larger, the tolerances become larger. On equipment the size of an aerial device, the tolerances translate into measurement errors of up to +1-2 degrees. Further, as the machine is operated and moved one direction then stopped then moved again, these errors grow. Further, measuring the angle and the speed of the gears is typically an indirect measurement or a mechanical measurement introducing more error. The rotation angles are usual measured by measuring the rotation motor output and correlating the motor output to the rotation. As such, this does not account for backlash and this indirect measurement is not as accurate as the no-backlash system described herein.

What is needed is a system that reduces or eliminates the backlash and decouples the measurement devices and sensors from the rotating equipment. Reducing the backlash eliminates unknowns in the position of the equipment, and decoupling the sensors from the rotating equipment eliminates error associated with the sensor movement.

Further, pinion gears associated with measurement systems with reduced backlash may still be subject to main gear variances. Components for the aerial device and the equipment described herein may be extremely large. For example, a rotation bearing for the main gear may be up to two feet in diameter. Due to manufacturing capabilities of the large components, there is an unavoidable variance of the location of the pinion gear axis relative to the main gear axis. Even if a tight mesh is achieved between the main gear and the pinion gear, the gears and shaft will shear and break during operation because of the variances as described above. Some current systems provide a flexible shaft that provides relief from the stresses in one axis. In embodiments described herein, a full three-axis decoupled system is provided by using a decoupled sensor detecting a magnetic field associated with a magnet attached to a shaft of the pinion gear. The sensor is completely detached from the magnet and any parts of the pinion gear or main gear. This provides a full three-axis decoupling of the sensor from the pinion gear and main gear. As such, the radial and axial tolerances of the rotation bearings (main gear) which vary with rotation position (eccentricity) are decoupled from the sensor.

Providing multiple levels of error reduction can reduce the error in measurement in these system to +/−0.1 degree.

SUMMARY

Embodiments of the invention solve the above-mentioned problems by providing a system that reduces or eliminates backlash by decoupling the measurement system from the gears by using, in some embodiments, a Hall effect sensor. With the sensor decoupled from the gears, the pinion gear teeth can be pressed into the main gear pitch to eliminate backlash and increase measurement accuracy.

A first embodiment of the invention is directed to a rotation measurement system for a machine to reduce backlash and detect a rotation of the machine comprising a first gear comprising an elastic material, a second gear, wherein the first gear is pressed into a second gear, wherein the elastic material deforms to a shape of the second gear such that the first gear is tightly meshed with the second gear, wherein the first gear rotates indicative of the machine rotation, a magnet coupled to the first gear such that a movement of the magnet is indicative of the rotation of the first gear, and a sensor detecting a magnetic field associated with the magnet, wherein a change in the magnetic field is indicative of the movement of the magnet.

A second embodiment of the invention is directed to a rotation measurement system for a machine to reduce backlash and detect a rotation of the machine comprising a first gear, a second gear, wherein the first gear rotates indicative of the machine rotation, a spring connected to the first gear at a proximal end and connected to the machine at a distal end, wherein the spring forces the first gear into the second gear to maintain a mesh, a magnet coupled to the first gear such that a movement of the magnet is indicative of the rotation of the first gear, and a sensor detecting a magnetic field associated with the magnet, wherein a change in the magnetic field is indicative of the movement of the magnet.

A third embodiment of the invention is directed to a rotation measurement system for a machine configured to reduce backlash and detect a rotation of the machine comprising a first, a second gear meshed with the first gear, wherein the first gear rotates indicative of a machine rotation, a magnet coupled to the first gear such that a movement of the magnet is indicative of the rotation of the first gear, and a sensor detecting a magnetic field associated with the magnet, wherein a change in the magnetic field is indicative of the movement of the magnet.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Generally, in some embodiments, a rotation measurement system is disposed on rotating equipment such as, for example, an aerial device, a crane, a boom truck, a cherry picker, or any other rotating machinery. In order to overcome the problems associated with measurement of the rotary devices, it is desirable to implement a three-axis decoupled sensor for measuring rotation angles and rotation speeds. Embodiments of the rotation measurement system comprise a pinion gear securing a tight mesh (full mesh or complete mesh as described below) to a main gear such that there is no, or minimal, backlash, or space between the gear teeth, reducing error in displacement when the gears rotate. The tight mesh may be achieved by using an elastically deformable material such as rubber for the pinion gear and pressing the pinion gear into the main gear. In some embodiments, the pinion gear may be pressed into the main gear using a spring and the pinion gear may be metal or elastic. In either case, a tight mesh is achieved without causing binding, unacceptable stress, or breaking of the gears.

In some embodiments, the pinion gear, the main gear, or both comprise an elastically deformable material. The elastically deformable material may be any material that may be elastically deformed when the gears are pressed together under normal conditions for operation. For example, metal gears may deform at a much higher pressure than is required for rubber. The pressures described herein are below that which is required to deform metal. Therefore, metal is not consider to be an elastic material under these conditions. Rubber may be used if rubber is both deformable to create a tight mesh and strong enough to maintain the mesh during operation of the machinery described herein. Elastic deformation is defined by the elastic modulus. The elastically deformable material, in some embodiments, may have an elastic modulus of less than 20 gigapascal (GPa).

In some embodiments, an encoder comprising at least one sensor for detecting the rotation of the equipment is decoupled from the rotating equipment such as, for example, the pinion gear. The use of the encoder for measurement increases the accuracy over past methods but remains susceptible to rotation errors. In some embodiments of the rotation measurement system described herein, the encoder is a contactless rotary encoder comprising an external independent contactless magnet that may be attached to the pinion gear such that the sensor may detect the magnetic field associated with the magnet and therefore the position of the pinion gear. Decoupling the encoder from the pinion gear allows the pinion gear to be tightly meshed with another gear thus providing a relative accuracy of position between the axis of the pinion gear and the axis of the main gear. As such, an accurate reading of the position of the magnet connected to the pinion gear may be measured by the decoupled sensor of the encoder. In some embodiments, the encoder may include a Hall effect sensor, and a magnet may be disposed on the end of a shaft co-axially aligned with the pinion gear but separate from the encoder. As the pinion gear rotates with the main gear, the position of the magnet is measured by the Hall effect sensor detecting the changing magnetic field associated with the magnet associated with the pinion gear. Combining the decoupled encoder and the tight mesh of the gears greatly reduces the location error associated with the redial error and axial error and measurement error associated with the rotation of the equipment.

Figure 1:
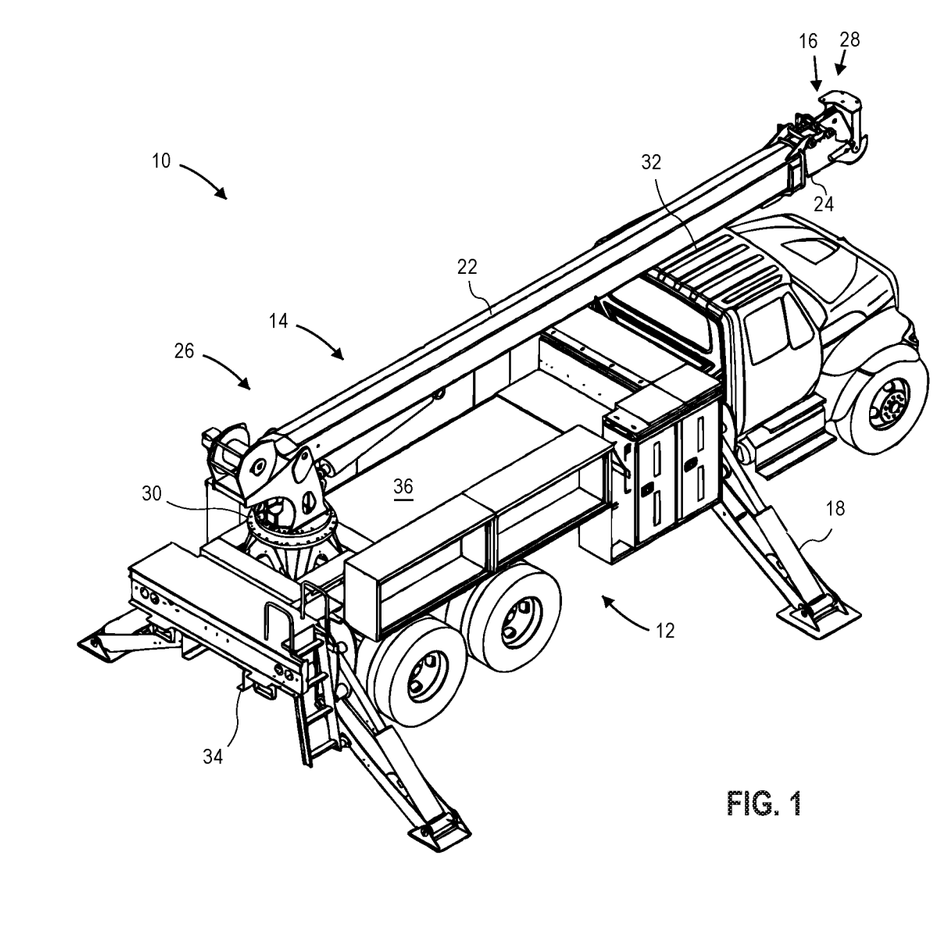
FIG. 1 is a perspective view of a utility vehicle with rotating equipment.

FIG. 1 presents an exemplary utility vehicle 10 with a rotatable boom that may be used in embodiments of the invention. The utility vehicle 10 (an exemplary boom truck)

generally comprises a base 12 with a boom assembly 14 rotatably mounted thereto. An implement 16 (such as a winch hook, a digger derrick, a pole guide, a utility platform, or other tool) is disposed on the boom assembly 14 to provide for the accomplishment of a task by a utility worker. The base 12 is stabilized by a set of outriggers 18. In some embodiments, the boom assembly 14 broadly comprises an outer boom section 22 and at least one inner boom section 24. The boom assembly 14 presents a proximal end 26 and a distal end 28. The proximal end 26 is rotatably and/or pivotably secured to a boom turret 30 of the base 12.

The proximal end 26 and/or the boom turret 30 may also have an associated operations cab 32. The operations cab 32 allows an operator to observe and control the operation of the boom assembly 14 while the utility vehicle 10 is stationary. Further, operation of the boom turret 30 may be controlled in the operations cab 32. In some embodiments, information indicative of a rotation such as a rotation angle, rotation speed, and rotation acceleration of the boom turret 30 may be received and displayed in the operations cab 32. The rotation information may be measured by sensors associated with the boom turret 30, the boom assembly 14, or any gears associated with the rotation. In some embodiments, the rotation information is measured by the encoder detecting a magnetic field indicative of the rotation as discussed further below.

The base 12 of the utility vehicle 10 is a selectively stabilized platform. In embodiments of the invention, the base 12 is an aerial device base, a crane base, an oilrig, an earth-working machine, an automobile, or a fixed structure. The base 12 provides stability and a counterweight to a load being supported by the boom assembly 14. The base 12 includes a chassis 34, which presents a deck 36 at a deck level. The chassis 34 of the utility vehicle 10 is typically mobile and moves via wheels rotatably secured to the base 12 below deck level.

Figure 2:
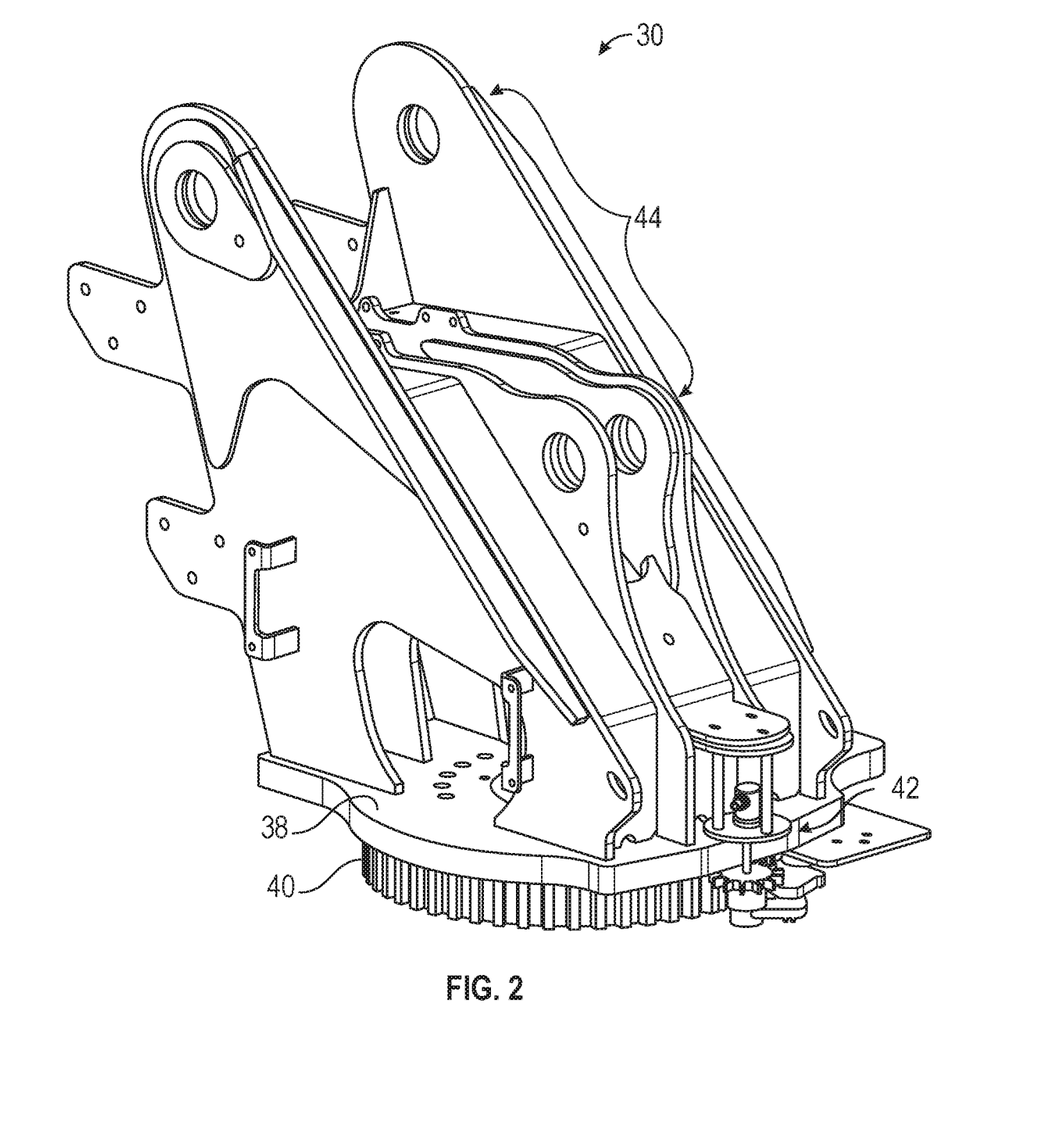
FIG. 2 is a close-up view of a boom turret, turntable, and an embodiment of a rotation measurement system.

FIG. 2 depicts a close-up view of the boom turret 30 from the exemplary embodiment depicted in FIG. 1. The boom turret 30 may be attached to a rotatable turntable 38. A main gear 40 may be provided on the turntable 38 that, in some embodiments, is stationary relative to the rotation of the turntable 38 and, in other embodiments, rotates with the turntable 38. The operation, or rotation, of the turntable 38 may be supplied from motors and controls provided on the base 12 or at a platform on the boom assembly 14. A rotation measurement assembly 42 may be mounted on any portion of the boom turret 30, turntable 38, or base 12 such that the rotation measurement assembly 42 may detect a measurement indicative of a rotation of the turntable 38, boom turret 30, and boom assembly 14. In the embodiments depicted in FIG. 2, the rotation measurement assembly 42 is mounted to the boom turret 30 and turns with the boom turret 30 while the main gear 40 remains stationary relative to the rotation of the boom turret 30. An interaction between a pinion gear of the rotation measurement assembly 42 and the main gear 40 allows for measurement of the rotation as described in detail below.

In some embodiments, the boom turret 30 may be attached to a crane, an aerial device, the boom assembly 14, or any other equipment as described above. The rotation may be provided from an engine of the base 12, utility vehicle 10, or any other portion of the utility vehicle 10 and may be controlled at the operations cab 32 by an operator or by any electronic or computer-implemented controller associated with the rotation measurement system.

In some embodiments, an engine, hydraulics, electrical motors, or pneumatics turn the turntable 38 and rotation measurement assembly 42 as well as any equipment attached to the boom turret 30. The boom assembly 14 or any other equipment may be attached at the boom turret 30 via attachment points 44. The rotation measurement assembly 42 may be attached to the boom turret 30 such that the rotation measurement assembly 42 rotates with the boom turret 30. The rotation measurement assembly 42 comprises a pinion gear decoupled or independent from the sensors such that the pinion gear rotates as the teeth of the pinion gear mesh with the main gear 40 that may be stationary relative to the rotating boom turret 30.

In some embodiments, the main gear 40 rotates with the boom turret 30 and the rotation measurement assembly 42 is mounted to the base 12, or any part of the utility vehicle 10, such that the rotation measurement assembly 42 does not rotate with the boom turret 30. In this case, the rotation measurement assembly 42 may separately measure the rotation of the boom turret 30 through the rotation via the pinion gear to the magnet and measure the magnetic field produced by the interaction of the proximity of the sensor to the magnet.

Figure 3:
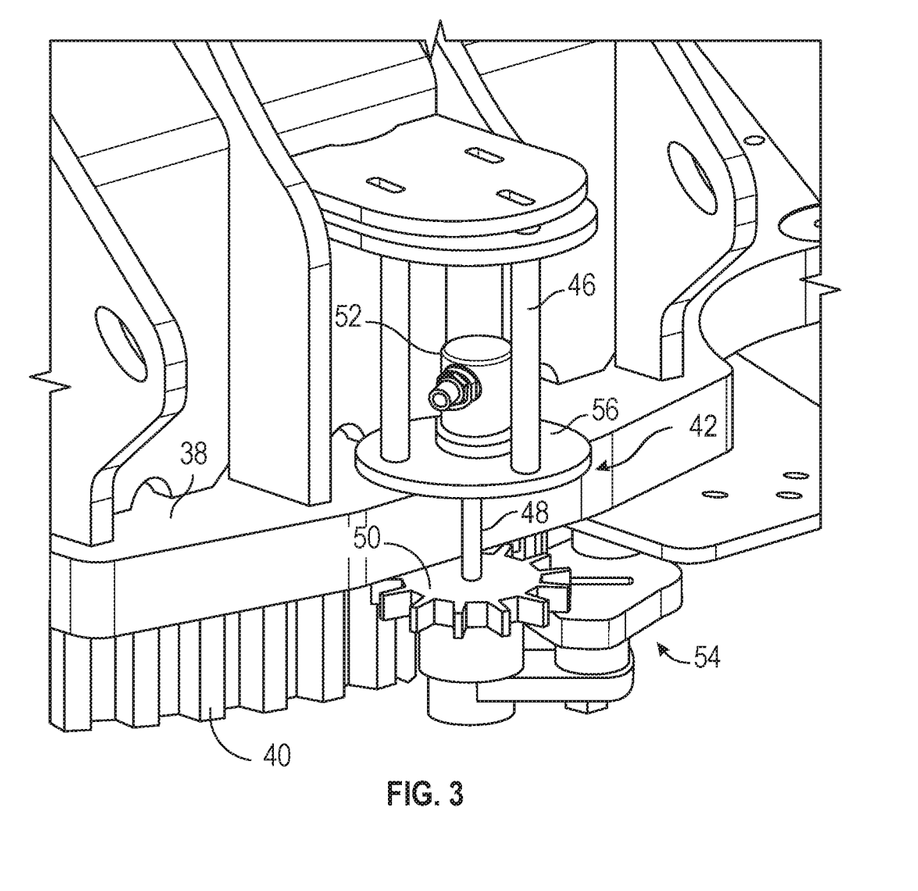
FIG. 3 depicts a close-up view of the rotation measurement system of FIG. 2.
Figure 6:
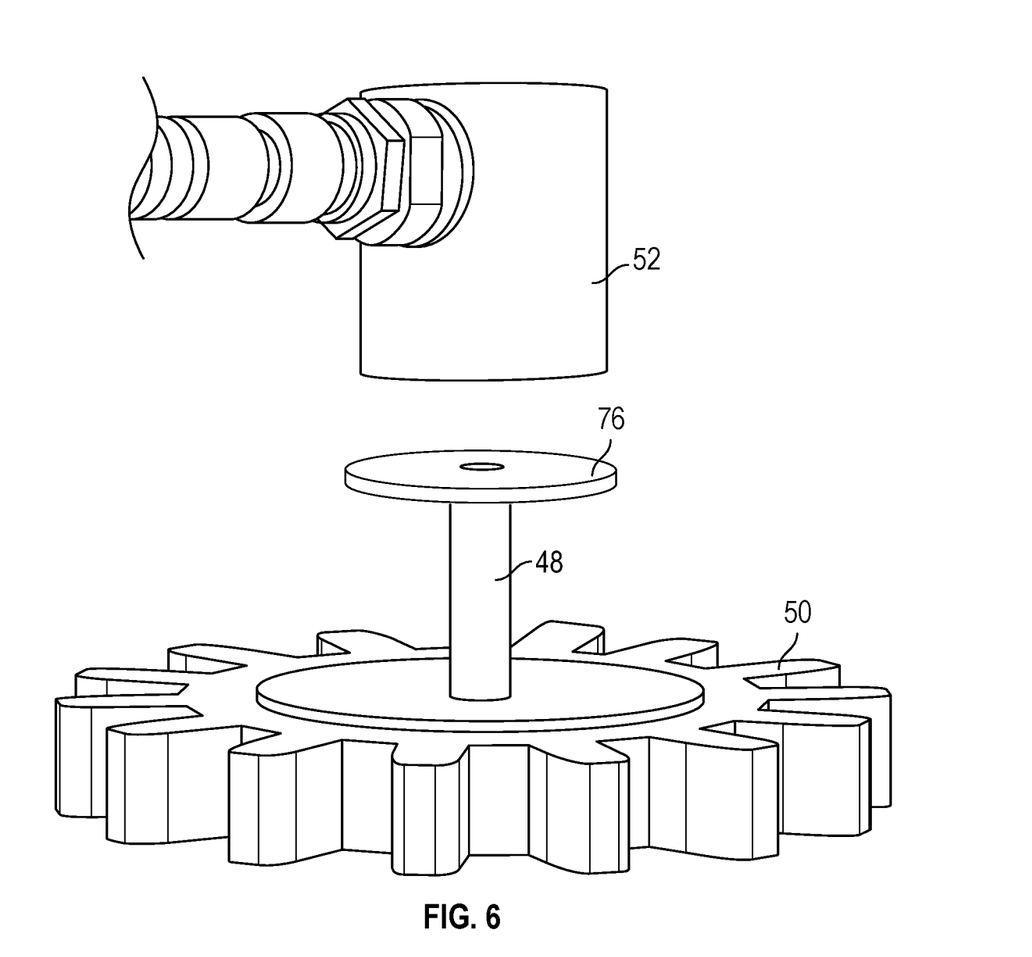
FIG. 6 is a close-up view of an embodiment of the encoder and the pinion gear assembly.

FIG. 3 depicts a close-up view of the rotation measurement assembly 42 comprising an encoder mount 46 with a magnet (as shown in FIG. 6) disposed on the end of a magnet shaft 48 attached to a pinion gear 50 and in close proximity to an encoder 52. As depicted, the pinion gear 50 is attached to the turntable 38 via the gear attachment assembly 54. In some embodiments, the gear attachment assembly 54 allows adjustment of the pinion gear 50 such that the pinion gear 50 may be moved toward and away from the main gear 40. The gear attachment assembly 54 may be moved toward the main gear 40 such that the pinion gear 50 is pressed into the main gear 40 such that a tight or 100% mesh occurs between the pinion gear 50 and the main gear 40 as described in detail below. In some embodiments, the pinion gear 50 comprises an elastically deformable material. The pinion gear 50 may be pressed into the main gear 40 such that the elastic material deforms to the shape of the main gear 40. The deforming material reduces, or eliminates, space between the pinion gear 50 and the main gear 40 resulting in no backlash between the pinion gear 50 and the main gear 40. This complete, full, ideal, or tight mesh provides no backlash because the main gear 40 and the pinion gear 50 are pressed together. For example, a tight mesh as used herein includes a mesh where a tooth of the pinion gear is fully received within a complementary pitch of the main gear. Thus, in embodiments, the pinion gear is pressed into the main gear to achieve a tight mesh. This is discussed in detail in regards to FIGS. 4A-B. Because the pinion gear 50 deforms to the shape of the main gear 40, there is no separation between the gears during rotation and stopping of the rotation. In some embodiments, the main gear 40 may comprise the deformable material or, in some embodiments, both the main gear 40 and the pinion gear 50 may comprise the elastically deformable material.

In some embodiments, the encoder 52 is mounted to the boom turret 30 via the encoder mount 46. In some embodiments, the encoder mount 46 may be attached to the base 12 or at any other location of the utility vehicle 10. The encoder mount 46 may be attached at any location on the utility vehicle 10 such that the encoder 52 is disposed proximate the magnet. In embodiments, the encoder mount 46 is mounted in a location such that the encoder mount is operable to measure the magnetic field. As the magnet moves the magnetic field changes in a predictable way. The change in the magnetic field is indicative of the rotation of the pinion gear 50.

In some embodiments, the magnet shaft 48 is associated with and rotates with the pinion gear 50. As depicted, the magnet shaft 48 is co-axially disposed on the pinion gear 50 such that the angle of rotation of the pinion gear 50 is equivalent to the angle of rotation of the magnet shaft 48. In some embodiments, the magnet shaft 48 may be non-coaxial disposed with the pinion gear 50. In such embodiments, movement of the magnet shaft 48 may still be indicative of the rotation of the pinion gear 50 by employing a gear reduction system. The gear reduction system translates the rotation of the main gear 40 to the pinion gear 50 through a series of intermediate gears. In the embodiment depicted, as the pinion gear 50 is moved into tight mesh position with the main gear 40, the magnet shaft 48 and associated magnet move with the pinion gear 50. Once the pinion gear 50 is in position and tightly meshed with the main gear 40, the encoder 52 may be moved into position proximate the magnet.

Once the pinion gear 50 is in place such that a complete mesh is formed between the pinion gear 50 and the main gear 40, the pinion gear 50 is secured. Once the pinion gear 50 is secured, the encoder 52 may be adjusted on the encoder mount 46 via an encoder mount base 56, such that the encoder 52 is in close proximity to the magnet on the magnet shaft 48. In some embodiments, the encoder 52 and the pinion gear 50 are moved together in a coupled way and decoupled once the pinion gear 50 is tightly meshed with the main gear 40.

In some embodiments, The encoder 52 may be a contactless rotary encoder including a robust sensing element that can tolerate the pinion sensor gear tracking precisely. The runout of the main gear 50 as well as any rotation, and inconsistencies in rotation, as described herein, may be detected. The encoder 52 may be calibrated to a specific placement proximal the magnet and designated a zero angle of rotation. Any rotational measurement of the magnet (which creates a magnetic field, as discussed immediately below) is then measured from the designated zero angle, such that rotational measurements may be relative to the zero angle. When the turntable 38, rotates, thus rotating the rotation measurement assembly 42, the pinion gear 50 rotates providing a changing magnetic field that may be measured by the encoder 52. In some embodiments, the encoder 52 is a Hall effect sensor and may measure the angle and, in some embodiments, the speed of rotation of the magnet extremely accurately.

Figure 4A:
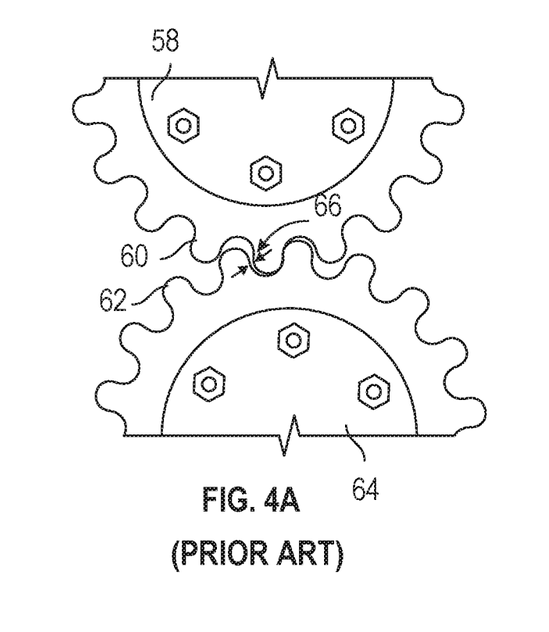
FIGS. 4A-B depict exemplary gears presenting backlash and no backlash.
Figure 4B:
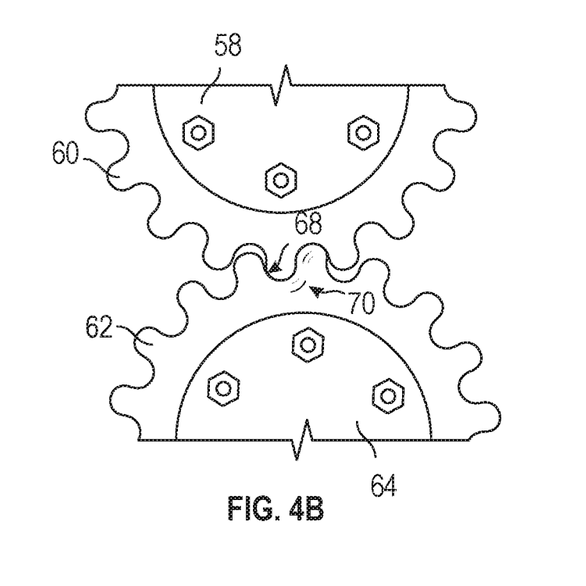

FIGS. 4A and 4B depict an embodiment of exemplary gears with backlash (FIG. 4A) and without backlash (FIG. 4B). FIG. 4A depicts a typical, prior art gear system that, as a primary gear 58 rotates, a front of the primary gear teeth 60 press against secondary gear teeth 62 rotating the secondary gear 64. Backlash 66 is provided between the primary gear teeth 60 and the secondary gear teeth 62 to tolerate imperfections such as, for example, manufacturing tolerances, thermal expansion, and wear. For example, the primary gear 58 may not be exactly round. Consequently, when the primary gear 58 rotates, it may rotate in a slightly oblong or elliptical rotation. If the primary gear 58 is tightly meshed with the secondary gear 64, this elliptical rotation will cause stress in the gears and could break either of the gears. Further, the gears may be subject to thermal expansion and wear, such that as the gears become heated or worn in certain areas and, again, cause stress in the material. What is needed, and embodiments of the invention described herein provide, is a material that can absorb the stress to create a tight mesh and reduce, or eliminate, backlash.

The backlash 66 results in error in measuring the rotation angle of the rotation equipment. The backlash 66 creates an inherent unknown angle in the primary gear 58 when a measurement associated with the secondary gear 64 is taken. Further, as the rotation is stopped, and if the primary gear 58 is the driver gear, the secondary gear 64 may further rotate based on the backlash 66. This rotation will create error in the starting point of the next rotation, thus creating lag and hysteresis error that accumulates each time the rotation starts and stops or, in some cases, slows.

FIG. 4B depicts a no-backlash gear configuration of embodiments of the invention, where the primary gear 58 and the secondary gear 64 are pressed together to create a tight mesh 68 where no backlash 66 is present. This is possible without breaking or binding the gears because the secondary gear 64 comprises an elastic material. The elastic material of the secondary gear 64 pressed into the primary gear 58 results in deformation 70 of the secondary gear 64. This allows the secondary gear 64 to be pressed into the primary gear 58 providing the tight mesh 68 and thus reducing error during rotation and stopping.

Further, the no-backlash gear configuration depicted in FIG. 4B provides a system that has minimal-to-no hysteresis error. Because the gears provide a tight mesh 68 as the driver gear rotates, the secondary gear 64 rotates in accordance with little to no delay. In a typical prior art system, when the primary gear 58 stops rotating, the secondary gear 64 may continue to rotate slightly causing error in the final measurement. This also causes error in the next measurement because the primary gear 58 must rotate slightly to contact the secondary gear 64 thus resulting in further error. However, in embodiments of the invention, the tightly meshed gear system of FIG. 4B reduces this error to nearly zero, as there is no lag and therefore zero to little hysteresis.

Figure 5:
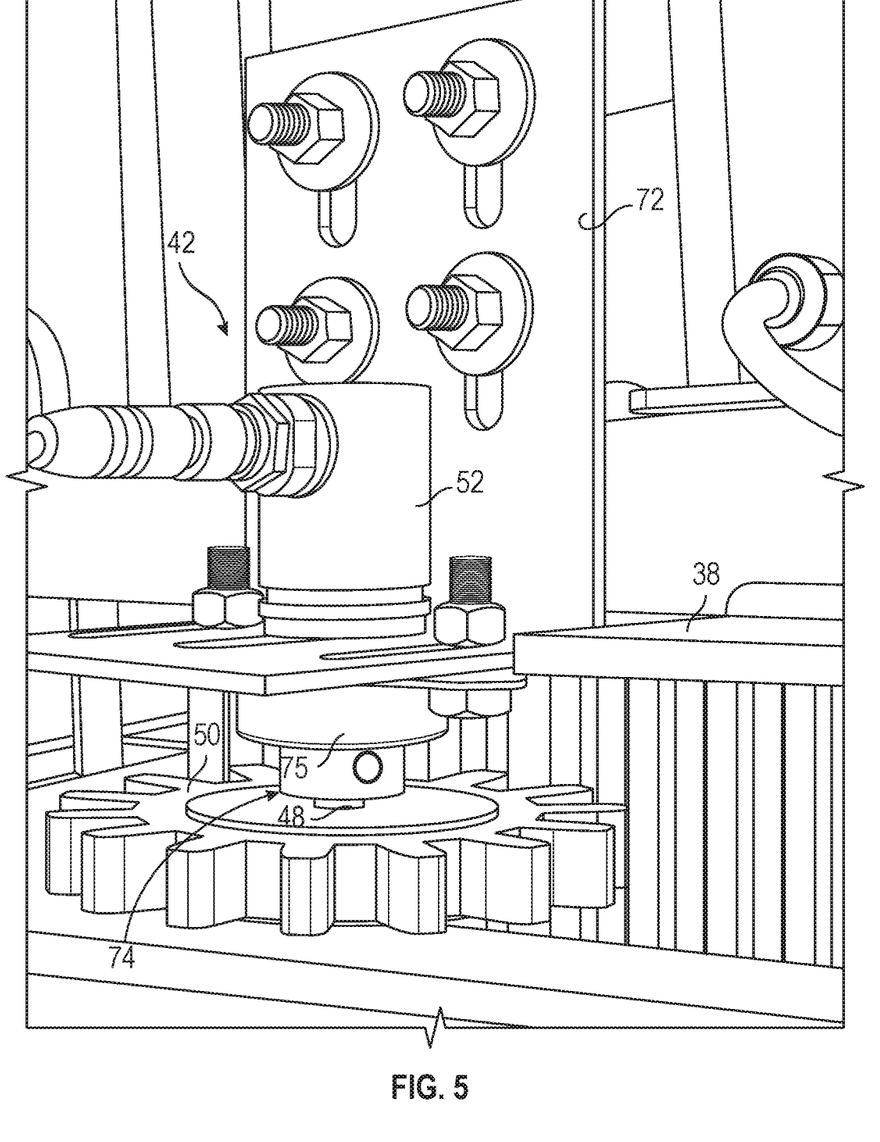
FIG. 5 is a close-up view of an embodiment of the rotation measurement system.

FIG. 5 depicts an embodiment of the rotation measurement assembly 42 comprising a pinion gear assembly 74 comprising the pinion gear 50, the magnet shaft 48, and the magnet (depicted in FIG. 6 below). A mounting bracket 72 may provide a mount for the pinion gear 50 while still maintaining decoupling between the encoder 52 and the pinion gear 50. In some embodiments, the mounting bracket 72 is encoder mount 46. As depicted the pinion gear 50 may be adjusted as described above and bolted to the mounting bracket 72 as depicted. However, the mounting bracket 72 may be attached to the turntable 38 or the boom turret 30 above the main gear 40, and the encoder 52 may be attached to the mounting bracket 72 as well. Once the pinion gear 50 is adjusted such that the pinion gear 50 is pressed into the main gear 40 providing tight mesh 68 (as shown in FIG. 4B), the encoder 52 may be secured above the pinion gear 50 and the magnet such that the encoder 52 is attached to the mounting bracket 72 and not directly coupled to the pinion gear assembly 74. This decoupling of the encoder 52 and the pinion gear assembly 74 provides a system where the measurement is not directly connected to the pinion gear 50 and is therefore not subject to stresses associated with the pinion gear 50. Because the angle is not mechanically measured, the angle measuring sensor, in this case the encoder 52, does not have to rotate or be subjected to the torque and speed required for the rotating equipment. This provides for accurate measurements over time with little wear and tear on the sensor and supporting structures. This also reduces the error in hysteresis because the sensor is not subject to the rotations and there is no backlash thus resulting minimal error in the system.

Further, measuring the angle and the speed of the gears is typically an indirect measurement or a mechanical measurement introducing more error. The rotation angles are typically measured by measuring the rotation motor and correlating the motor output to the rotation. As such, this does not account for backlash and this indirect measurement is not as accurate as the no-backlash system described herein. Further, these measurements are taken by measuring devices coupled to the actual moving components. Therefore, the error in the movement of the sensors and measurement devices is included in the total error in the measurement. In embodiments described herein, the encoder 52 is decoupled from the pinion gear 50 thus decreasing the error as described above.

In some embodiments, the pinion gear 50 is mounted to the mounting bracket 72 as shown in FIG. 5. Alternatively, the pinion gear 50 may be mounted directly to the boom turret 30. As the boom turret 30 turns, the pinion gear 50 rotates the magnet shaft 48 including the magnet disposed on the magnet shaft 48. As the magnet shaft 48 rotates the encoder 52 detects the changing magnetic field associated with the magnet and indicative of the rotation. In any case the pinion gear 50 may be mounted to the mounting bracket 72 via a bearing assembly 75. The bearing assembly 75 may provide a structure for supporting the pinion gear 50 and the magnet shaft 48 while allowing the pinion gear 50 and the magnet shaft 48 rotation relative to the mounting bracket 72.

In some embodiments, the magnet may be connected to the pinion gear 50 such that the magnet will rotate in a 3-dimensional position with the encoder 52 such that the encoder 52 may detect the magnetic field associated with the magnet and the encoder 52. The encoder 52 may be calibrated such that a particular magnetic field detection is indicative of a particular position of the pinion gear 50, main gear 40, and ultimately the position of the boom turret 30 and the boom assembly 14. Because the pinion gear 50 is elastically pressed into the main gear 40, the backlash in the system is reduced, or in embodiments, eliminated, such that the magnetic field is indicative of the rotational position of the boom turret 30 and boom assembly 14. In some embodiments, the angular error is within +/−0.1 degrees. A typical system of the size of the utility vehicle 10 measures an angle to within +/−2 degrees error. The accurate measurements provided by the rotation measurement system provided herein may also be applied to a rotational velocity and acceleration.

During operation, as the main gear 40 rotates with error but within tolerance, the pinion gear 50 is allowed to elastically deform such that the pinion gear 50 maintains tight mesh without breaking. Because the encoder 52 is not connected to the magnet shaft 48 or any part of the pinion gear 50 or main gear 40, there is no possibility of binding and/or breaking the magnet shaft 48, encoder 52, or any mounting brackets that are decoupled from the pinion gear assembly 74. This allows more accurate measurements because the pinion gear 50 maintains tight mesh with the main gear 40. The tight mesh results in little to no backlash and reduced hysteresis after stopping rotation, restarting rotation, and possibly alternating directions. Further, any tolerances and expansion or contraction of the gears due to temperature variances or other outside errors is absorbed by the material, such that it is not measured in the encoder 52 during operation.

In some embodiments, the pressure supplied by the pinion gear 50 on the main gear 40 may be based at least in part on the operation of the rotational equipment. For example, the size, shape, and rotation speed of the main gear 40, the boom turret 30, the turntable 38, and an accumulation of the various rotating equipment may directly affect the pressure required to maintain tight mesh. For example, a large gear may have larger relative variances in manufacturing. Therefore, the pinion gear 50 may be allowed to deform slightly more based on the material or the pressure at which the pinion is pressed into main gear 40. Further, the pressure applied may be based on the type of material used, and the material used may be based on the function. For example, a large machine may turn slowly. This may require a softer material such that the mesh may be maintained, but the material may not be likely to encounter high stresses based on the slow rotation. Alternatively, the boom turret 30 may turn relatively quickly such that a less deformable material may be needed to endure the associated stresses but still soft enough to press into the main gear 40 and maintain total mesh. A balance may be made between the material and the pressure such that an optimal material and pressure may be selected for the intended function of the machine. In some embodiments, the deformable material may comprise an elastic modulus of below 20 GPa as described above. This provides a material that may be more elastic than steel gears but strong enough to maintain a tight mesh during operation.

FIG. 6 depicts an embodiment of the magnet 76 connected to the magnet shaft 48 coupled to the pinion gear 50. The magnet 76 is disposed in close proximity to the encoder 52 such that as the pinion gear 50 rotates, the magnet shaft 48 rotates and the magnet 76 rotates. Rotation of the magnetic field within the encoder 52 generates a magnetic field, and the magnetic field is then detected and measured by the encoder 52. Thus, the changing magnetic field generated by the magnet 76 is indicative of the rotation of the pinion gear 50, which in turn is indicative of the rotation of the turntable 38, boom turret 30, and other rotating equipment discussed above. The encoder 52 detects the changing magnetic field associated with the magnet 76 and determines the angle of rotation by storing, in a data store, and processing, with a processor, the sensor output. The sensor output is indicative of the magnetic field and detected by the sensor. The results may be sent to a controller via a transmitter and receiver combination and may be used to control the rotation of the machine and may also be sent for display to an operator in the operations cab 32, in the implement 16, or at a remote location. The encoder 52 and associated processors, data stores, and communication equipment is depicted in FIG. 8 and described in detail below. In some embodiments, the magnet shaft 48 is used to support the pinion gear 50 and any other object coupled thereto as depicted in FIGS. 5 and 7.

In some embodiments, a full three-axis decoupled system is provided by using a decoupled sensor in the encoder 52 detecting a magnetic field change associated with the magnet 76 attached to a magnet shaft 48 of the pinion gear 50. A sensor disposed with space between the sensor and magnet 76 provides a full three axis decoupling of the sensor from the pinion gear 50 and main gear 40. As such, the radial and axial tolerances of the rotation bearings (main gear 40), which vary with rotation position (eccentricity), are decoupled from the sensor. Decoupling the encoder 52 from the pinion gear 50 allows the pinion gear 50 to be tightly meshed with the main gear 40 thus providing a relative accuracy of position between the axis of the pinion gear 50 and the axis of the main gear 40. As such, an accurate reading of the position of the magnet 76 connected to the pinion gear 50 may be measured by the decoupled sensor of the encoder 52. In some embodiments, the encoder 52 may include a Hall effect sensor, and the magnet 76 may be disposed on the end of the magnet shaft 48 co-axially aligned with the pinion gear 50. Combining the decoupled encoder 52 and the tight mesh of the gears greatly reduces the location error associated with the radial error and axial error associated with the rotation of the equipment.

Figure 7:
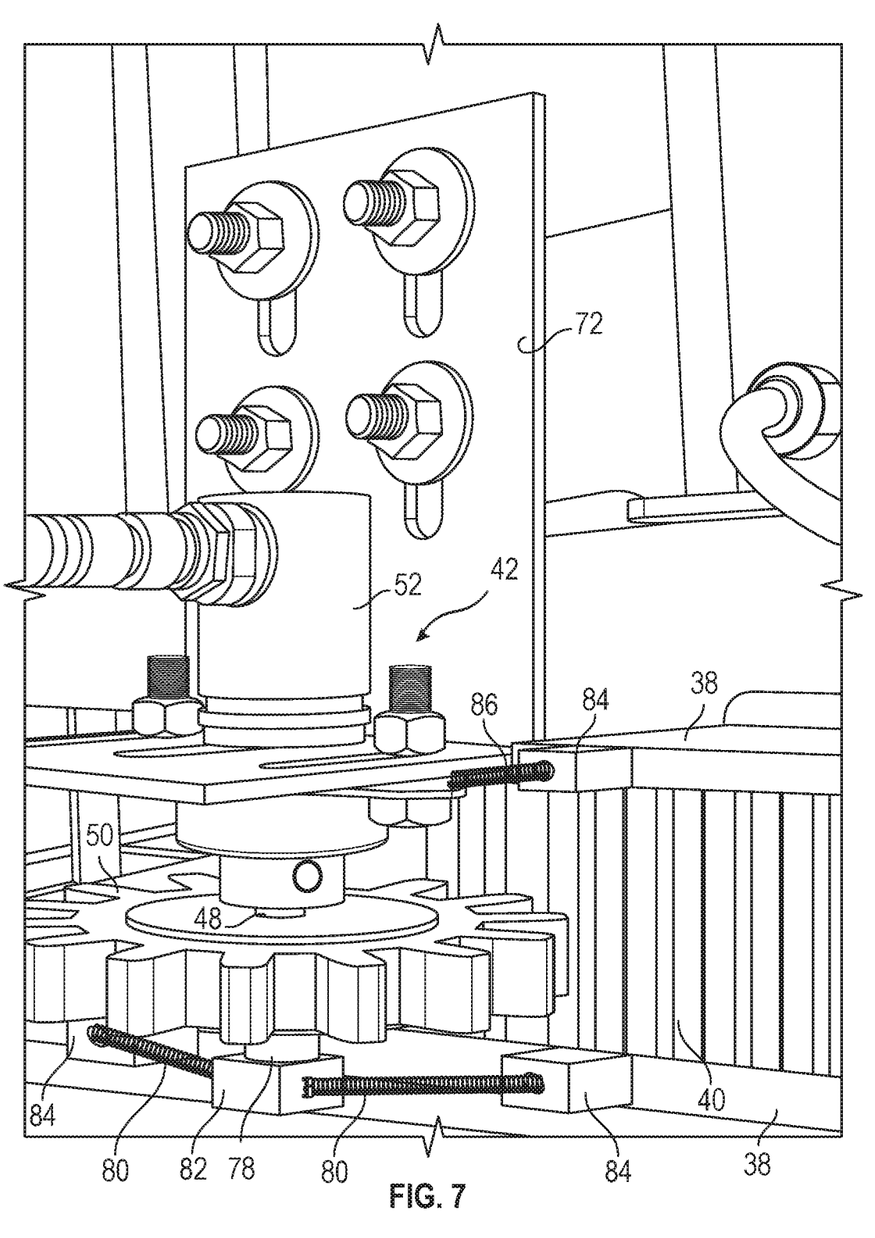
FIG. 7 is a close-up view of an embodiment of the rotation measurement system.
Figure 8:
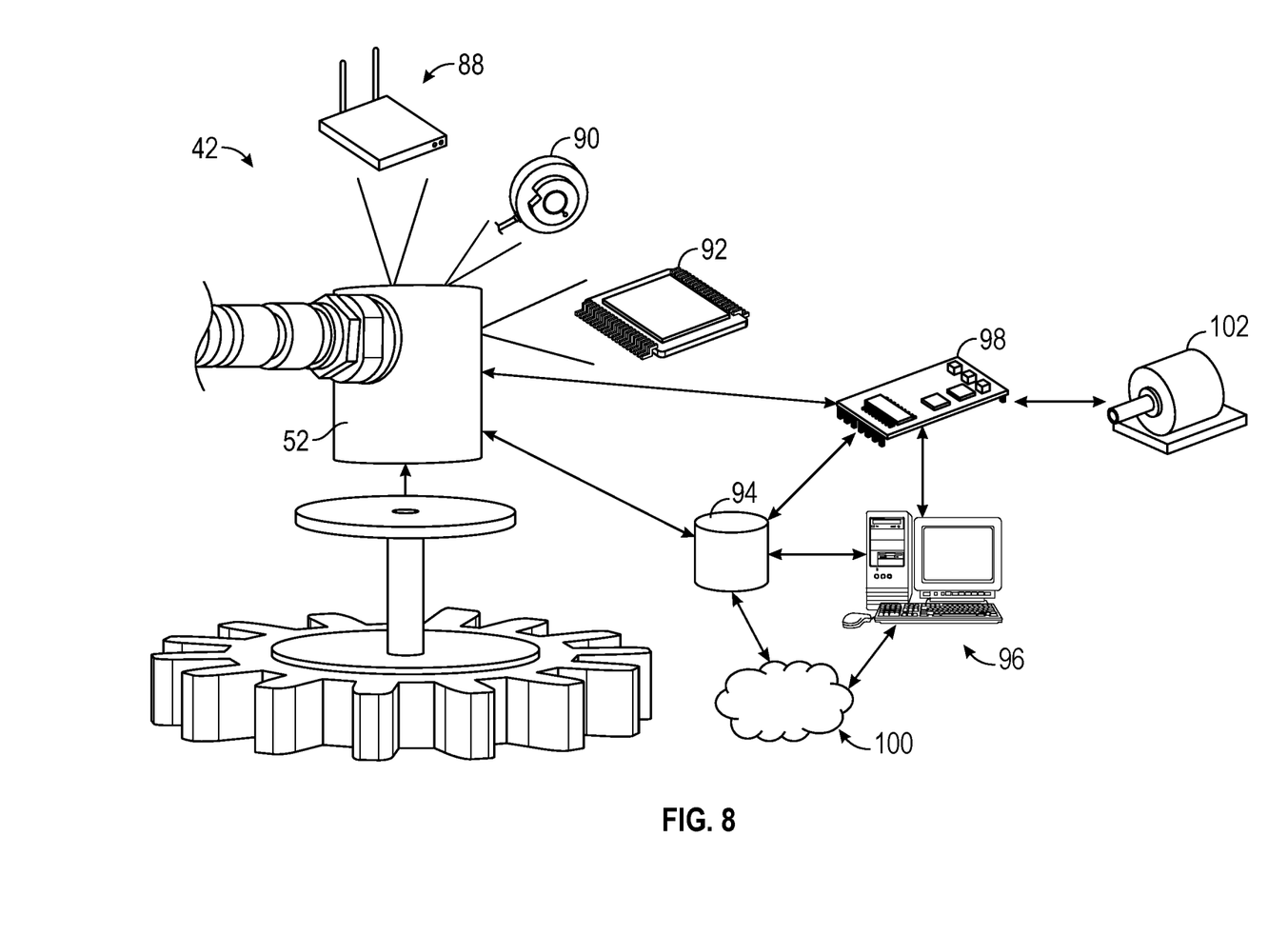
FIG. 8 depicts hardware for implementing embodiments of the invention.

FIG. 7 depicts an embodiment of the rotation measurement assembly 42 that allows the pinion gear 50 to mesh with the main gear 40 through the use of springs. In some embodiments, the pinion gear 50, in this configuration, comprises metal, and a lower shaft 78 is coupled to the pinion gear 50 for connecting springs. However, in this configuration the pinion gear 50 may also comprise the elastic material described above. Lower springs 80 may be connected to a shaft spring attachment 82 and the turntable 38 at the spring mounts 84. The lower springs 80 may be placed in a state of tension to pull the teeth of the pinion gear 50 into the pitch of the main gear 40. The teeth of the pinion gear 50 may be pressed against the pitch of the main gear 40 by the force of the lower springs 80. As the turntable 38 rotates the lower springs 80 may extend and contract to allow the pinion gear 50 to move with any inconsistencies in the manufacturing and wear on the gears. This allows the pinion gear 50 to maintain mesh during operation.

In some embodiments, the spring locations as well as the spring strength, length, and tension may be adjusted to provide the necessary force needed to maintain complete mesh while allowing the variability of the error in the main gear 40 and pinion gear 50, such that the springs are not stretched out of tolerance. In some embodiments, the springs may be attached at a point above the pinion gear 50 such as the upper springs 86 or below such as the lower springs 80. In some embodiments, the springs may be attached above and below.

In some embodiments, the springs may be selected based on the operation and the characteristics of the equipment. For example, larger springs such as, for example, springs that provide more tension may be needed for gears that rotate large equipment or high speeds. Smaller springs providing less tension may be used for low pressure and softer materials for the pinion gear 50. The springs used may be determined and selected based on the pressure required to maintain mesh, reduce hysteresis and the material used for the pinion gear. In some embodiments, the pinion gear 50 is not bolted tightly to the mounting bracket 72, such that the pinion gear 50 is allowed translate to and from the main gear 40 when the pinion gear rotates irregularly due to manufacturing tolerances and wear. The springs hold the pinion gear 50 in tight mesh with the main gear 40 to reduce error in measurement.

In some embodiments, a proximity detector such as an optical sensor, RFID, an electrical field detector, or any other sensor may be disposed on the boom assembly 14, boom turret 30 or any other location on the aerial device 10, such that a proximity of the boom assembly 14 with a target location is sensed. When the location of the boom turret 30 is determined relative to the target location, the rotation angle may be measured and stored such that the boom turret 30 may rotate the boom assembly 14 from the location and then may rotate the boom assembly 14 back to said location from the stored memory.

Turning now to FIG. 8 depicting hardware for implementing embodiments of the invention. In some embodiments, the encoder 52 includes a transmitter/receiver 88, a sensor 90, a processor 92, a data store 94, and any other hardware such as system buses and servers for implementing embodiments described herein. In some embodiments, the sensor 90 detects the changing magnetic field associated with the magnet 76 and is a Hall effect sensor as described above.

In some embodiments, the data store 94 may store non-transitory computer-readable media that when executed by at least one processor performs the acts described herein. The encoder 52 may be in communication, via the transmitter/receiver 88, with at least one computer 96, at least one controller 98, and at least one network 100 for communicating locally and remotely. In some embodiments, the processor 92 is a server for communication with the network 100. The processor 92 may be in communication with the controller 98 and computer 96 as described herein and communicate via transmitters and receivers for wired or wireless communication. The controller 98 may be in communication with at least one actuator 102 for operating the turntable 38, boom assembly 14, implement 16, or any other part of the utility vehicle 10. The controller 98 may also be operable to sound alarms and send alerts via the network 100 in the event of an emergency.

In some embodiments, a desired rotation angle of the boom assembly 14 may be set, or stored in the data store 94, such that the boom turret 30 may turn to the position each time by pressing a button in the operations cab 32. In some embodiments, the rotation is fully automated such that the boom assembly 14 performs a plurality of automated operations at a plurality of stored rotation angles and the rotation is performed automatically by the controller 98 and actuator 102.

Figure 9:
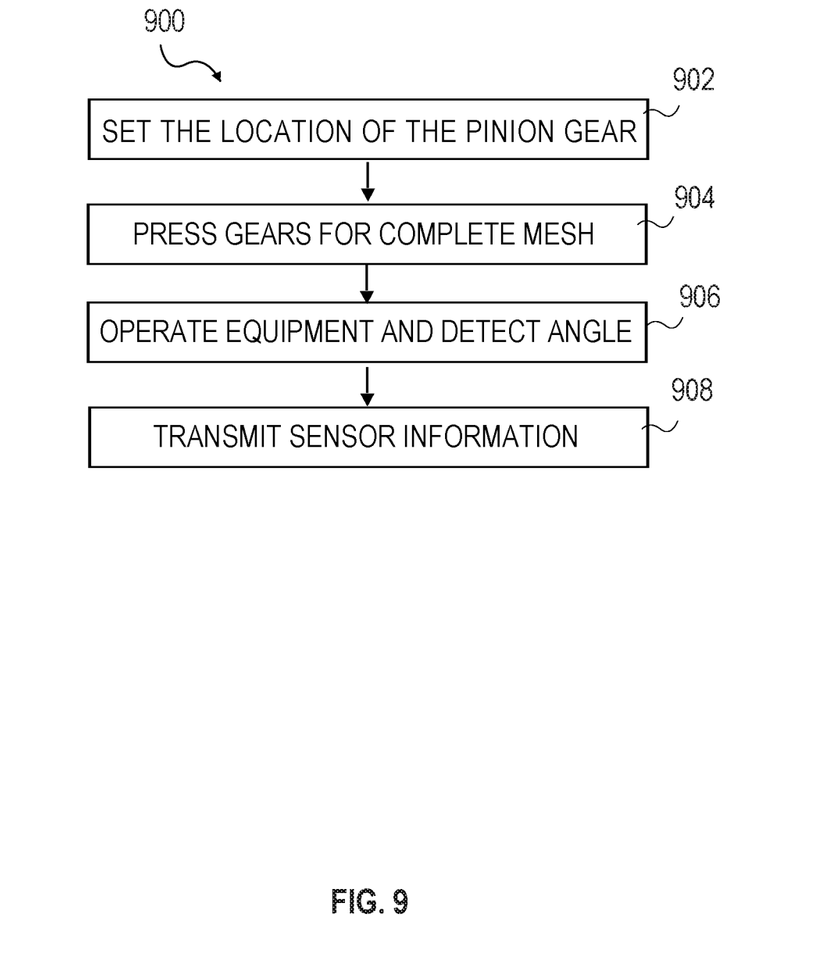
FIG. 9 is a flow diagram representing a method of implementing the rotation measurement system.

FIG. 9 depicts an exemplary flow diagram 900 representing a method of measuring a rotation angle for embodiments of the invention. At a Step 902, the pinion gear assembly 74 is adjusted such that the pinion gear 50 is in tight mesh with the main gear 40 as described in embodiments above. The pinion gear 50 may be adjusted manually or automatically pressing the teeth of the pinion gear 50 into the pitch of the main gear 40. In some embodiments, the pinion gear 50 may be made of an elastically deforming material such as, for example, rubber, that, when pressed into the main gear 40, the elastic material deforms to the contours of the main gear 40. In some embodiments, the pinion gear 50 is metal and may be placed with the teeth of the pinion gear 50 in the pitch of the main gear 40 and may be held in place and allowed to rotate using springs.

At a Step 904, the pinion gear 50 is secured such that a complete mesh is maintained during operation of the equipment as described in embodiments above. The pinion gear 50 may be pressed into the main gear 40 by manual or automatic adjustment. Once the pinion gear 50 is pressed into the main gear 40 the pinion gear 50 may be secured with the fasteners as depicted in FIGS. 5 and 7 above. In some embodiments, the pinion gear 50 may be secured such that, in the case of an elastic material pinion gear 50, the pinion gear 50 provides an amount of force sufficient to maintain tight mesh throughout the operation of the rotatable equipment (e.g. the boom assembly 14). In the case of a spring providing the force of the pinion gear 50 to the main gear 40, the pressure may be provided by the size and tension of the spring and the pinion gear 50 may be metal and not provide the tight mesh.

In some embodiments, the pressure supplied by the pinion gear 50 on the main gear 40 may be based at least in part on the operation of the equipment. For example, the size, shape, and rotation speed of the main gear 40 and the pinion gear 50 may directly affect the pressure required to maintain tight mesh as described above. The pressure may be provided by the elastic material and the type of material may be selected based on the force required to maintain tight mesh. Further, the spring size and tension may be decided based on and indicative of the pressure required to maintain tight mesh.

At a Step 906, the equipment is rotated as described in embodiments above. The exemplary boom assembly 14 may be rotated by a motor via the boom turret 30. As the boom turret 30 rotates the pinion gear 50 rotates and the magnet shaft 48 and the magnet 76 associated with the pinion gear 50 rotates indicative of the rotation of the boom assembly 14 and the boom turret 30. The magnet 76 is disposed proximate the encoder 52 and as the magnet 76 rotates the magnetic field associated with the magnet 76 predictably changes. The encoder 52, which in some embodiments comprises a Hall effect sensor, detects the magnetic field and the changes in the magnetic field associated with the magnet 76. The detected magnetic field may be indicative of a rotation angle, rotation speed, and a rotation acceleration of the equipment.

At a Step 908, information obtained from the encoder 52 is processed and transmitted. The information indicative of the angle and speed of the rotation or movement may be processed to determine the angle and the speed and stored in data store 94. In some embodiments, the information is transmitted to a processor then determined and sent to the controller 98 for a following action such as, for example, further rotation or signaling an operator. In some embodiments, the angle and speed is sent to an indicator to inform the operator in the operations cab 32, in a platform on the boom assembly 14, or at a remote location.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A rotation measurement system for a machine to reduce backlash and detect a rotation of the machine comprising:
   a first gear comprising an elastic material,
   a second gear,
   wherein the first gear is pressed into the second gear,
   wherein the elastic material deforms to a shape of the second gear such that the first gear is tightly meshed with the second gear,
   wherein the first gear rotates indicative of the machine rotation;
   a magnet coupled to the first gear such that a movement of the magnet is indicative of the rotation of the first gear,
   wherein the magnet is disposed on a shaft coupled to the first gear and in close proximity to the sensor;
   a sensor detecting a magnetic field associated with the magnet,
   wherein a change in the magnetic field is indicative of the movement of the magnet,
   wherein the sensor is coupled to at least one of a turntable and a boom turret and is mounted independently of the first gear; and
   a mounting bracket securing the first gear to the at least one of the turntable and the boom turret such that the first gear is meshed with the second gear.

2. The rotation measurement system of claim 1, wherein the elastic material is at least one of rubber and plastic and a rotation of the second gear induces the rotation of the first gear.

3. The rotation measurement system of claim 1, wherein the sensor is a Hall effect sensor.

4. The rotation measurement system of claim 1, wherein the machine is one of a crane, an aerial device, and a utility vehicle.

5. The rotation measurement system of claim 1, wherein an error of a measurement angle of rotation of the first gear measured by the sensor is less than one degree.

6. The rotation measurement system of claim 1, further comprising at least one spring forcing the first gear into the second gear to provide the tight mesh.

7. The rotation measurement system of claim 6, wherein the elasticity of the elastic material is indicative of at least one of a speed of rotation and a pressure to which the first gear and the second gear are forced together by the spring.

8. A rotation measurement system for a machine to reduce backlash and detect a rotation of the machine comprising:
   a first gear comprising an elastic material;
   a second gear,
   wherein the first gear rotates indicative of the machine rotation;
   a spring connected to the first gear at a proximal end and connected to the machine at a distal end,
   wherein the spring forces the first gear into the second gear deforming the elastic material of the first gear to maintain a mesh;
   a magnet coupled to the first gear such that a movement of the magnet is indicative of the rotation of the first gear,
   wherein the magnet is mounted on a shaft coupled to the first gear and in close proximity to the sensor;
   a sensor detecting a magnetic field associated with the magnet,
   wherein a change in the magnetic field is indicative of the movement of the magnet,
   wherein the sensor is coupled to at least one of a turntable and a boom turret and is mounted independently of the first gear; and
   a mounting bracket securing the first gear to the at least one of the turntable and the boom turret such that the first gear is meshed with the second gear.

9. The rotation measurement system of claim 8, wherein the sensor is mounted independently of the first gear.

10. The rotation measurement system of claim 8, wherein the sensor is disposed with space between the sensor and the shaft such that the sensor detects the magnetic field associated with the magnet and the sensor is mounted independently of the first gear.

11. A rotation measurement system for a machine configured to reduce backlash and detect a rotation of the machine comprising:
   a first gear comprising an elastic material;
   a second gear meshed with the first gear,
   wherein the first gear rotates indicative of the machine rotation;
   a magnet coupled to the first gear such that a movement of the magnet is indicative of the rotation of the first gear;
   a sensor detecting a magnetic field associated with the magnet,
   wherein a change in the magnetic field is indicative of the movement of the magnet;
   a mounting bracket securing the first gear to at least one of a turntable and a boom turret of the machine such that the first gear is pressed into the second gear; and
   at least one bolt securing the first gear to the mounting bracket such that the first gear is pressed into the second gear,
   wherein the elastic material deforms to a shape of the second gear providing a tight mesh between the first gear and the second gear.

12. The rotation measurement system of claim 11, further comprising at least one spring forcing the first gear into the second gear, wherein the second gear is comprised of metal.

13. The rotation measurement system of claim 11, wherein the machine is at least one of a crane, an aerial device, and a utility vehicle, and wherein the sensor is a Hall effect sensor.

\* \* \* \* \*